May 8, 1934.  H. L. SMITH  1,958,213

DYNAMO-ELECTRIC MACHINE

Filed Feb. 5, 1932

Inventor:
Harold L. Smith.
By: [signature]
Attorney

Patented May 8, 1934

1,958,213

UNITED STATES PATENT OFFICE 1,958,213

DYNAMO-ELECTRIC MACHINE

Harold L. Smith, Milwaukee, Wis., assignor to The Louis Allis Company, Milwaukee, Wis., a corporation of Wisconsin Application February 5, 1932, Serial No. 591,064

3 Claims. (Cl. 172—36)

The invention relates to dynamo electric machines and applies to various types thereof.

The dynamo electric machine to which the invention applies in particular is of the type in which the stator is provided with a laminated core arranged between its ends and with an end plate arranged upon each of its ends, and the rotor is provided with a shaft bearing in each end plate.

The dynamo electric machine which is described and claimed herein is a modification of the invention described and claimed in my Patent No. 1,799,071, issued March 31, 1931.

The present application is a continuation, as to matters common to both applications, of my copending application Serial No. 526,023, filed March 28, 1931.

The invention has as an object to provide a dynamo electric machine in which a supporting frame provides an outer casing and in part a closed inner casing.

Another object is to provide a dynamo electric machine with a stator having a sturdy and efficient construction.

According to the invention as ordinarily embodied in practice, a dynamo electric machine is provided with a stator having a supporting frame formed by inner and outer shells connected by integral ribs and spaced from each other to provide a ventilating passage for external air, a laminated core arranged within said frame and having its heat dissipated by direct metallic conduction to external air, a closed end plate arranged upon each end of said stator and forming therewith a closed inner casing having sufficient strength to resist an internal gaseous explosion, a rotor arranged within said stator and having its shaft bearing in each end plate, and a joint formed between each end plate and said stator and between each end plate and said shaft to quench ignited gas from within said inner casing before it reaches the exterior thereof.

The dynamo electric machine which is hereinafter described and shown in the accompanying drawing is an induction motor.

Figure 1:
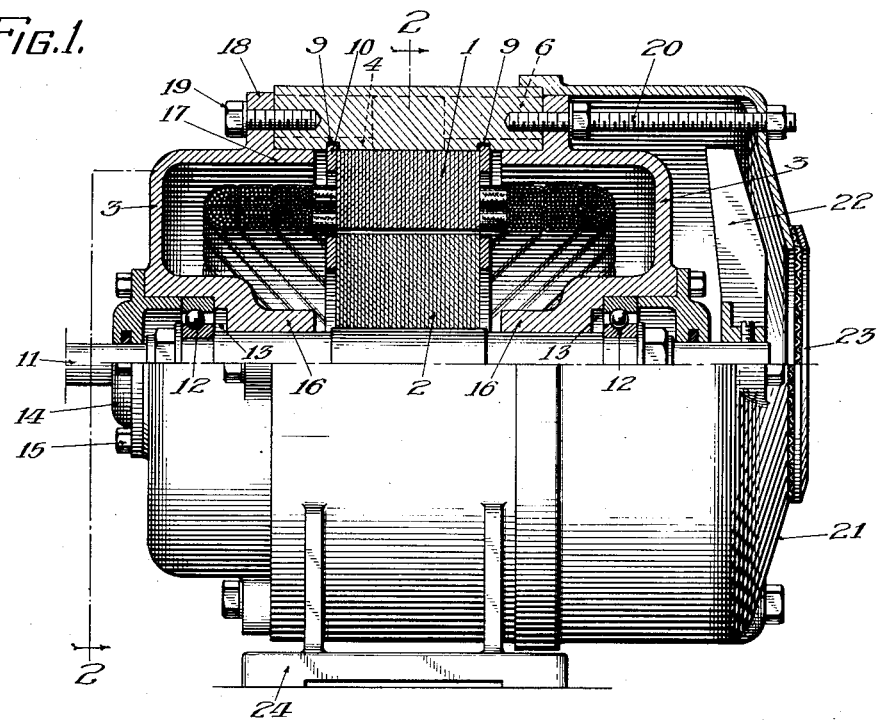
Fig. 1 is a front view partly in central section.
Figure 2:
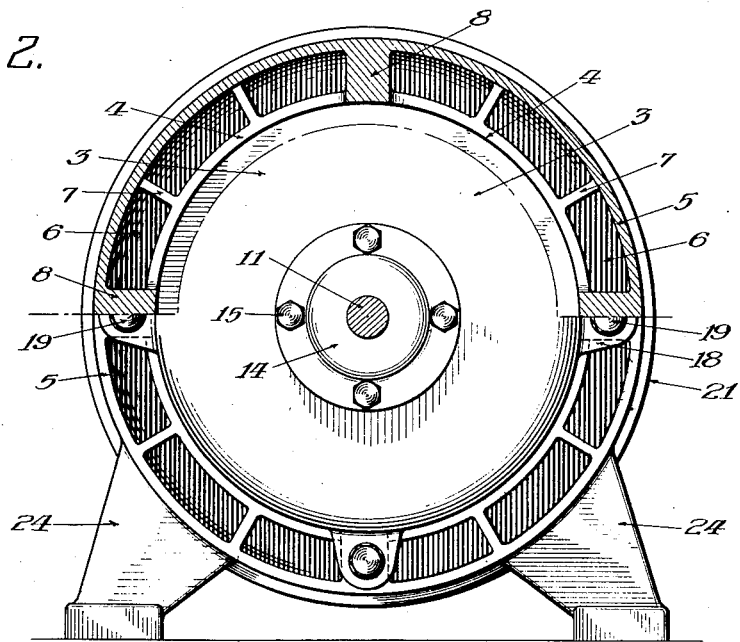
Fig. 2 is an end view partly in section taken on the irregular line 2—2 of Fig. 1.

The motor is provided with a stator having a laminated core 1 carrying a primary winding and a rotor having a laminated core 2 carrying a secondary winding.

The stator has arranged upon each end thereof a removable closed end plate 3 to form therewith a closed inner casing having sufficient strength to resist and confine a gaseous explosion within its interior.

The stator is provided with a supporting frame having an inner shell which is formed of two rings 4 spaced apart to provide an opening therebetween, and an outer shell 5 which is spaced from the inner shell.

The outer shell forms an outer casing and provides between itself and the inner shell a ventilating passage 6 for external air.

The outer and inner shells are formed integral with each other and joined by radial ribs 7 and 8 formed integral therewith.

The stator core is arranged within the inner shell in engagement with the inner surface thereof and has its outside surface between the inner edges of the rings 4 exposed to external air passing through the passage 6.

Each rib 7 extends across a ring 4 and terminates at the edges thereof, and each rib 8 extends across both rings 4 and has the part thereof between the inner edges of the rings in engagement with the outside of the stator core to hold the laminations thereof in position and to conduct heat therefrom.

The stator core dissipates its heat by direct metallic conduction to external air passing through the passage 6.

The inner shell is provided at each end of the stator core with a groove 9 in which an expansion ring 10 is arranged to hold the stator core in position within the supporting frame.

The rotor core is arranged within the stator core and carried by a shaft 11 having a ball bearing 12 in each end plate.

The ball bearing is arranged within a socket 13 formed in the end plate and it is held therein by a removable cap 14 fastened to the end plate by bolts 15.

The end plate has formed thereon apart from the bearing for the shaft a central sleeve 16 extending over and around the shaft to form an elongated joint between the end plate and the shaft.

The elongated joint thus formed between the end plate and the shaft has sufficient length to quench ignited or exploded gas from within the inner casing before it reaches the exterior thereof.

The end plate has a peripheral flange 17 extending within and around upon the inner periphery of the supporting frame to form therewith an elongated joint between the end plate and the stator.

The joint thus formed between the end plate and the stator has sufficient length to quench ignited or exploded gas from within the inner casing before it reaches the exterior thereof.

The end plates are provided with radial lugs 18 in alinement with the ribs 8.

The left end plate is attached to the supporting frame and held in firm engagement therewith by bolts 19 which pass through the lugs 18 and are threaded into the ribs 8.

The right end plate is attached to the supporting frame and held in firm engagement therewith by one or more bolts 19 and two or more elongated stud bolts 20 each of which passes through a lug 18 and is threaded into a rib 8.

The supporting frame has arranged upon the right end thereof an end casing 21 which is held in position thereon by the stud bolts 20.

The ventilating passage 6 has external air passed therethrough by a fan 22 arranged in the end casing and carried by the rotor shaft.

The end casing is provided with a central inlet opening 23 to admit external air thereto.

The motor is carried and supported by a base or feet 24 which are connected to the supporting frame and may be formed integral therewith.

The motor which has been explained has high capacity and efficiency for a given size core and given overall dimensions, even though it is enclosed within a closed inner casing, as its core dissipates its heat at a high rate by direct metallic conduction to external air.

The invention herein set forth is susceptible of various modifications within the scope of the appended claims.

The invention is hereby claimed as follows:

1. A dynamo electric machine, comprising a stator provided with a supporting frame having outer and inner shells spaced from each other by integral ribs to provide a passage for external air, a laminated core arranged within said frame and having its heat transferred by direct metallic conduction to external air passing through said passage, a removable closed end plate arranged upon each end of said stator and forming therewith a closed inner casing having sufficient strength to resist a gaseous explosion within its interior, bolts connecting said end plates to said ribs, a rotor arranged within said stator and having its shaft bearing in each end plate, and a joint formed between each end plate and said stator and between each end plate and said shaft to quench ignited gas from within said inner casing before it reaches the exterior thereof.

2. A dynamo electric machine, comprising a stator provided with a supporting frame having two inner shells spaced from each other and an outer shell spaced from said inner shells to provide a ventilating passage and joined to said inner shells by ribs integral therewith, a laminated core arranged within said frame and having its heat transferred by direct metallic conduction to external air passing through said ventilating passage, a removable closed end plate arranged upon each end of said stator and forming therewith a closed inner casing having sufficient strength to resist a gaseous explosion within its interior, a rotor arranged within said stator and having its shaft bearing in each end plate, and a joint formed between each end plate and said stator and between each end plate and said shaft to quench ignited gas from within said inner casing before it reaches the exterior thereof.

3. A dynamo electric machine, comprising the combination with a stator provided with a supporting frame having an outer and an inner casing enclosing a ventilating passage therebetween to conduct external air through said stator, a laminated core arranged within said inner casing and carried thereby and having its heat transferred by direct metallic conduction to external air in said ventilating passage, and a winding arranged upon said core and projecting from each end thereof, of a closed end plate arranged upon each end of said stator in proximity to said winding and forming with parts of said stator a closed inner casing having a small space therein between the same and the parts enclosed thereby and sufficient strength to resist and confine an explosion of a high-explosive gas therein, a joint formed between each end plate and said stator to quench ignited gas from within said inner casing, a rotor arranged within said core and carried by a shaft extending through each end plate and having a bearing therein, and a sleeve arranged upon the inside of each end plate and surrounding said shaft to reduce the space within the inner casing and forming apart from the bearing for said shaft a joint to quench ignited gas from within said inner casing.

HAROLD L. SMITH.